US012706452B2

(12) United States Patent
Döbler et al.

(10) Patent No.: US 12,706,452 B2
(45) Date of Patent: Aug. 11, 2026

(54) CIRCUIT BREAKER DEVICE AND METHOD

(71) Applicant: Siemens Aktiengesellschaft, Munich (DE)

(72) Inventors: Fabian Döbler, Theilenhofen (DE); Christopher Fromme, Fürth (DE); Dominic Malane, Eichstätt (DE); Marvin Tannhäuser, Hausen (DE)

(73) Assignee: Siemens Aktiengesellschaft, Munich (DE)

( * ) Notice: Subject to any disclaimer, the term of this patent is extended or adjusted under 35 U.S.C. 154(b) by 134 days.

(21) Appl. No.: 18/258,599

(22) PCT Filed: Nov. 12, 2021

(86) PCT No.: PCT/EP2021/081507
§ 371 (c)(1),
(2) Date: Jun. 21, 2023

(87) PCT Pub. No.: WO2022/135789
PCT Pub. Date: Jun. 30, 2022

(65) Prior Publication Data

US 2024/0275162 A1 Aug. 15, 2024

(30) Foreign Application Priority Data

Dec. 21, 2020 (DE) ..................... 10 2020 216 413.4

(51) Int. Cl.
*H02H 3/26* (2006.01)

(52) U.S. Cl.
CPC .................................. *H02H 3/265* (2013.01)

(58) Field of Classification Search
CPC ...................................................... H02H 3/265
See application file for complete search history.

(56) References Cited

U.S. PATENT DOCUMENTS 4,694,402 A 9/1987 McEachern et al.
4,864,287 A * 9/1989 Kierstead ................ H02H 7/08 340/657

(Continued)

FOREIGN PATENT DOCUMENTS

EP 0416569 A2 3/1991
JP 2008043144 A 2/2008

(Continued)

OTHER PUBLICATIONS

Lindmayer, M. et al:. “Digitale Algorithmen zur frühzeitigen Kurzschlußerkennung”, [Digital algorithms for early short-circuit detection], Elektrotechnische Zeitschrift ETZ, Issue: 112/13-14, 1991, pp. 718-722—English abstract.

(Continued)

*Primary Examiner* — Peter M Novak
(74) *Attorney, Agent, or Firm* — Laurence A. Greenberg; Werner H. Stemer; Ralph E. Locher

(57) ABSTRACT

A circuit breaker device for protection of an electrical low-voltage circuit determines the voltage level of the low-voltage circuit in such a way that current voltage values are provided and current threshold values are provided. The current voltage values are compared with the current threshold values in terms of phase angle in such a way that when the current threshold values are exceeded or undershot or a differential voltage value is formed from the current threshold value and the current voltage value, the differential voltage value is compared with a differential voltage threshold value and when it is exceeded or undershot, an interruption of the low-voltage circuit is initiated in order to avoid a short-circuit current. A method for protecting an electrical low-voltage circuit is also provided.

19 Claims, 5 Drawing Sheets

(56) References Cited

U.S. PATENT DOCUMENTS

| | | | | |
|---|---|---|---|---|
| 5,229,651 | A * | 7/1993 | Baxter, Jr. | H02H 3/24<br>700/297 |
| 5,804,889 | A * | 9/1998 | Hu | H02J 9/06<br>307/64 |
| 6,577,484 | B1 * | 6/2003 | Macbeth | H02H 1/0015<br>361/92 |
| 10,541,530 | B2 | 1/2020 | Kennedy et al. | |
| 2006/0119368 | A1 | 6/2006 | Sela et al. | |
| 2018/0217187 | A1 | 8/2018 | Urakawa et al. | |
| 2021/0241989 | A1 * | 8/2021 | Kouroussis | H01H 71/1081 |

FOREIGN PATENT DOCUMENTS

| | | | |
|---|---|---|---|
| WO | 2014084980 | A1 | 6/2014 |
| WO | 2015028634 | A1 | 3/2015 |
| WO | 2015084980 | A2 | 6/2015 |

OTHER PUBLICATIONS

Mützel, T.: Dissertation “Verfahren zur Kurzschlussfrüherkennung zur Verbesserung der strombegrenzenden Wirkung mechanischer Leistungsschalter im Kurzschlussfall” [Procedure for early short-circuit detection to improve the current-limiting effect of mechanical circuit breakers in the event of a short-circuit], 2008, Technische Universität Ilmenau—English abstract.

* cited by examiner

Second
Subunit
A/D Converter
First
Subunit
Mechanical
Isolating
Contact
System
L1
N1
EQ
TRIPG
MK
SED
SEA
ADC
Microprocessor
CPU
Voltage
CU
Comparator
SWU
DU
Voltage
SU
Sensor
TU
Current
CI
Comparator
SWI
DI
Current
SI
Sensor
TI
TS
Logic
LG
Unit
TRIP
Electronic Interruption Unit
EU
L2
ES
N2

Second Subunit
First Subunit
SEDE
SEAE
Threshold
SWE
Value Unit
φ(t)
U
UE
SWU
DU
NSE
Grid
Synchronization
Unit
Voltage
Comparator
CU
TRIP Threshold
SWE
Value Unit
φ(t)
U
SWU/DSW
DU
NSE
Grid
Synchronization
Unit
UE
DE
DW
Voltage
Comparator
CU
TRIP
Differential Unit

CIRCUIT BREAKER DEVICE AND METHOD

The invention relates to the technical field of a circuit breaker device for a low-voltage circuit having an electronic interruption unit and a method for a circuit breaker device for a low-voltage circuit having an electronic interruption unit.

Low voltage denotes voltages of up to 1000 volts AC or up to 1500 volts DC. Low voltage in particular denotes voltages that are greater than ultra-low voltage, with values of 50 volts AC or 120 volts DC.

Low-voltage circuit or grid or installation denotes circuits with nominal currents or rated currents of up to 125 amperes, more specifically up to 63 amperes. Low-voltage circuit denotes in particular circuits with nominal currents or rated currents of up to 50 amperes, 40 amperes, 32 amperes, 25 amperes, 16 amperes or 10 amperes. Said current values denote in particular nominal, rated and/or deactivation currents, that is to say the maximum current that is normally carried through the circuit or at which the electrical circuit is normally interrupted, for example by a protection device, such as a circuit breaker device, miniature circuit breaker or circuit breaker.

Miniature circuit breakers are overcurrent protection devices that have long been known and that are used in low-voltage circuits in electrical installation. They protect lines against damage caused by heating resulting from excessively high current and/or a short circuit. A miniature circuit breaker is able to automatically deactivate the circuit in the event of an overload and/or short circuit. A miniature circuit breaker is a fuse element that does not reset automatically.

Circuit breakers, in contrast to miniature circuit breakers, are designed for currents greater than 125 A, in some cases also starting even from 63 amperes. Miniature circuit breakers therefore have a simpler and more delicate design. Miniature circuit breakers usually have an attachment possibility for attachment to what is known as a top-hat rail (carrier rail, DIN rail, TH35).

Miniature circuit breakers have an electromechanical design. In a housing, they have a mechanical switching contact or shunt trip for interrupting (tripping) the electric current. A bimetal protection element or bimetal element is usually used for tripping (interruption) in the event of a persistent overcurrent (overcurrent protection) or in the event of a thermal overload (overload protection). An electromagnetic tripping device with a coil is used for the brief tripping in the event of an overcurrent limit value being exceeded or in the event of a short circuit (short circuit protection). One or more arc extinguishing chambers or arc extinguishing devices are provided. Connection elements for conductors of the electrical circuit to be protected are also provided.

Circuit breaker devices having an electronic interruption unit are relatively new developments. They have a semiconductor-based electronic interruption unit. In other words, the flow of electric current through the low-voltage circuit is carried through semiconductor components or semiconductor switches, which interrupt the flow of electric current or are able to be switched to the on state. Circuit breaker devices having an electronic interruption unit often also have a mechanical isolating contact system, in particular having isolator properties in accordance with relevant standards for low-voltage circuits, wherein the contacts of the mechanical isolating contact system are connected in series with the electronic interruption unit, that is to say the current of the low-voltage circuit to be protected is carried both through the mechanical isolating contact system and through the electronic interruption unit.

In the case of semiconductor-based circuit breaker devices or protection devices, or solid-state circuit breakers, SSCB for short, the switching energy does not, like in the case of a mechanical switching device, have to be converted into an arc, but rather converted into heat by way of an additional circuit, the energy absorber. The deactivation energy in this case comprises the energy stored in the circuit, that is to say in the grid impedances, line impedances or load impedances (consumer impedances). To unload the energy absorber, the current flowing at the time of deactivation has to be as low as possible. This also applies to the case of a short circuit. In this case, the current rises very quickly. Quickly recognizing a short circuit makes it possible to recognize a short circuit early and to avoid an excessively high short-circuit current. The semiconductor-based circuit breaker device interrupts the circuit almost without a delay, within μs, as part of a deactivation process. No high currents occur and the loading of the energy absorber of a semiconductor-based circuit breaker device is reduced. Known short-circuit recognitions or deactivation criteria are usually based on ascertaining and evaluating the current actual value.

The present invention relates to low-voltage AC circuits having an AC voltage, usually having a time-dependent sinusoidal AC voltage with the frequency f, typically 50 or 60 hertz (Hz). The temporal dependency of the instantaneous voltage value u(t) of the AC voltage is described by the equation:

$$u(t) = U * \sin(2\pi * f * t)$$

wherein:

u(t)=instantaneous voltage value at the time t

U=amplitude (maximum value) of the voltage

A harmonic AC voltage may be represented by the rotation of a vector, the length of which corresponds to the amplitude (U) of the voltage. The instantaneous deflection is in this case the projection of the vector onto a coordinate system. An oscillation period corresponds to one full revolution of the vector and its full angle is 2π (2 pi) or 360°. The angular frequency is the rate of change of the phase angle of this rotating vector. The angular frequency of a harmonic oscillation is always 20 times its frequency, in other words:

$$\omega = 2\pi * f = 2\pi / T = \text{angular frequency of the AC voltage}$$

(T=period duration of the oscillation)

It is often preferable to give the angular frequency (ω) as opposed to the frequency (f) since many formulae in oscillation theory are able to be represented in a more compact manner with the aid of the angular frequency due to the occurrence of trigonometric functions, the period of which by definition is 2π:

$$u(t) = U * \sin(\omega t)$$

In the case of angular frequencies that are not temporally constant, the term instantaneous angular frequency is also used.

In the case of a sinusoidal, in particular temporally constant, AC voltage, the time-dependent value consisting of the angular velocity ω and the time t corresponds to the time-dependent angle φ(t), which is also referred to as phase angle φ(t). In other words, the phase angle φ(t) periodically passes through the range 0 . . . 2π or 0° . . . 360°. In other words, the phase angle periodically adopts a value between 0 and 2π or 0° and 360° (φ=n*(0 . . . 2π) or φ=n*(0° . . . 360°), due to periodicity; in short: φ=0 . . . 2π or φ=0° . . . 360°).

Instantaneous voltage value u(t) accordingly denotes the instantaneous value of the voltage at the time t, that is to say, in the case of a sinusoidal (periodic) AC voltage, the value of the voltage at the phase angle φ (φ=0 . . . 2π or φ=0° . . . 360°, of the respective period).

SUMMARY OF THE INVENTION

The object of the present invention is to improve a circuit breaker device of the type mentioned at the outset, in particular to show a quick and alternative possible way of recognizing short circuits and ensuring a reliable interruption.

This object is achieved by a circuit breaker device having the features described below, and by a method having the steps described below.

According to the invention, provision is made for a circuit breaker device for protecting an electrical low-voltage circuit, in particular low-voltage AC circuit, having:

- a voltage sensor for ascertaining the level of the voltage of the low-voltage circuit such that instantaneous/phase angle-related voltage values are available,
- an electronic interruption unit that, due to semiconductor-based switching elements, has a high-resistance state of the switching elements for interrupting and a low-resistance state of the switching elements for allowing current to flow in the low-voltage circuit,
- a control unit that is connected to the voltage sensor and the interruption unit.

According to the invention, the circuit breaker device is designed such that instantaneous threshold values are available, that is to say that instantaneous threshold values, that is to say phase angle-related threshold values, are available for each phase angle or a phase angle range (multiple phase angles) or a phase angle section (part of a phase angle). The instantaneous voltage values ascertained by the voltage sensor are compared with the instantaneous threshold values in terms of phase angle, that is to say a threshold value for a phase angle is compared with the voltage value for the same phase angle of the voltage.

Depending on the type of comparison, an interruption of the low-voltage circuit is initiated if the instantaneous threshold values are exceeded or undershot in order to avoid a short circuit. In particular, the instantaneous threshold value is generally set to be lower than the expected instantaneous voltage value. If the instantaneous voltage value undershoots the instantaneous threshold value in the positive half-cycle of the voltage, the low-voltage circuit is interrupted, specifically by the electronic interruption unit. In the negative half-cycle of the voltage, if the instantaneous threshold value is exceeded (greater voltage in terms of the value (since negative), but lower voltage in terms of the absolute value), the low-voltage circuit is interrupted in order to avoid a short circuit, since a short circuit is associated with a voltage dip. Alternatively, an (instantaneous) differential voltage value is (continuously) formed from the instantaneous threshold value and the instantaneous voltage value. The (instantaneous) differential voltage value is compared with an (absolute or instantaneous) differential voltage threshold value. If said threshold value is exceeded or undershot, depending on the sign of the difference formation and the half-cycle of the voltage, an interruption of the low-voltage circuit is initiated in order to avoid a short-circuit current (which is associated with a voltage dip which is recognized by this solution).

The invention therefore advantageously makes it possible to very quickly recognize short circuits (in the region of a phase angle of the voltage or less). Furthermore, there is advantageously no need for current ascertainment or a current sensor (but rather only voltage ascertainment or a voltage sensor). The ascertainment of short circuits is based on a pure voltage measurement between the (two) conductors of the low-voltage circuit. Short-circuit monitoring can therefore be advantageously subsequently integrated, for example, without interrupting conductors of the low-voltage circuit.

Advantageous embodiments of the invention are given in the dependent claims.

In one advantageous embodiment of the invention, the instantaneous threshold values are adapted on the basis of the amplitude of the voltage of the low-voltage circuit such that there is a high instantaneous threshold value in the case of a high amplitude of the voltage and there is a low instantaneous threshold value in the case of a low amplitude of the voltage.

In this case, as stated at the outset, amplitude denotes the maximum value of the voltage. Furthermore, "on the basis of the amplitude" denotes in this case the amplitude of at least one or more full oscillations (or period durations) of the electrical voltage (1 . . . n*360°). That is to say, the threshold values are intended to be adapted only after at least one full oscillation)(360° (since there is logically only one amplitude after at least one full oscillation) or after multiple full oscillations of the electrical voltage, in particular after 5 to 25 full oscillations, that is to say after 100 ms to 500 ms (for 50 Hz). Alternatively, an adaptation can also be carried out only in the seconds range, and brief grid fluctuations then have no effect on the threshold values.

This has the particular advantage that the instantaneous threshold values are adapted in a manner based on long-term voltage changes (that is to say over multiple period durations or oscillations) in order to accurately and quickly recognize voltage dips caused by short circuits.

In one advantageous embodiment of the invention, the absolute values of the instantaneous voltage values are compared with the instantaneous threshold values (in particular in terms of absolute value) in terms of phase angle such that, if the absolute value of the instantaneous threshold value is undershot, or

- the differential voltage value is formed from the instantaneous threshold value (in particular in terms of absolute value) and the absolute value of the instantaneous voltage value, the differential voltage value is compared with the differential voltage threshold value and, if said threshold value is exceeded, an interruption of the low-voltage circuit is initiated.

This has the particular advantage that an evaluation of the threshold value monitoring that is independent of positive or negative half-cycle of the voltage can be implemented since only the absolute values must be taken into account.

In one advantageous embodiment of the invention, the exceeding or undershooting can be present for a first time interval in order to initiate an interruption of the low-voltage circuit. The first time interval denotes, in particular, exceeding over multiple phase angles, in particular over a phase angle of 0.1°, or a first time interval of greater than 5.6 μs, more specifically a phase angle of 0.1° to 0.2°- or 5.6 μs to 111 μs.

This has the particular advantage that it is possible to achieve a robust solution which avoids false tripping in the event of brief spikes.

In one advantageous embodiment of the invention, the circuit breaker device is designed such that the control unit has an analog first subunit and a digital second subunit. The first subunit has a voltage comparator, to which the instantaneous voltage values from the voltage sensor and the instantaneous threshold values from the second subunit are supplied, for comparing the instantaneous voltage values with the instantaneous threshold values and initiating an interruption of the low-voltage circuit if said threshold values are exceeded or undershot. The instantaneous voltage values are also supplied to the second subunit in order to ascertain the instantaneous threshold values.

This has the particular advantage that there is an efficient architecture. The first analog subunit may carry out a very quick comparison of instantaneous voltage values and threshold values, thus making it possible to quickly recognize short circuits. The second subunit may carry out a threshold value calculation or adaptation that is independent thereof and that does not need to be carried out as quickly as the recognition. The threshold values may be buffer-stored, for example, in order to be available for a quick comparison. The threshold values need not be constantly adapted.

In one advantageous embodiment of the invention, the circuit breaker device is designed such that provision is made for a grid synchronization unit. The grid synchronization unit can, from the supplied instantaneous voltage values:

ascertain an expected temporal value (UE) of the voltage,
ascertain a phase angle (φ(t)) of the voltage,
ascertain the amplitude (U) of the voltage.

Furthermore, provision is made for a threshold value unit, to which the expected temporal value, the phase angle (φ(t)) and the amplitude (U) of the voltage are supplied. The threshold value unit ascertains the instantaneous threshold values therefrom. The instantaneous voltage values are compared with the instantaneous threshold values in order to ascertain the initiation of an interruption.

This has the particular advantage that a simple comparison option and implementation are provided, in particular when using a PLL.

In one advantageous embodiment of the invention, the circuit breaker device is designed such that provision is made for a grid synchronization unit which, from the supplied instantaneous voltage values:

outputs an expected temporal value (UE) of the voltage,
outputs a phase angle (φ(t)) of the voltage,
outputs the amplitude (U) of the voltage.

Provision is made for a threshold value unit, to which the phase angle (φ(t)) and the amplitude (U) of the voltage are supplied and which ascertains differential voltage threshold values, in particular instantaneous differential voltage threshold values, therefrom.

The instantaneous voltage values and the expected temporal value of the voltage are supplied to a differential unit which ascertains a differential voltage value, in particular a phase angle-dependent differential voltage value. The instantaneous differential voltage value is compared with the differential voltage threshold value, in particular the instantaneous differential voltage threshold value, in order to ascertain the initiation of an interruption.

This has the particular advantage that a further simple comparison option and implementation are provided, in particular when using a PLL.

In one advantageous embodiment of the invention, provision is made for a mechanical isolating contact system which is connected in series with the electronic interruption unit on the circuit side such that galvanic isolation can be provided in the low-voltage circuit. The mechanical isolating contact system is connected to the control unit.

This has the particular advantage that both a quick interruption of the electrical low-voltage AC circuit by the electronic interruption unit and galvanic isolation, in particular with isolator properties according to the standards, that is to say activation, can be implemented. There is therefore a comprehensive circuit breaker device.

In one advantageous embodiment of the invention, a current sensor for ascertaining the level of the current of the low-voltage circuit is provided.

This has the particular advantage that further advantageous protection and safeguarding functions are enabled.

In one advantageous embodiment of the invention, galvanic isolation is initiated in the case of a (defective) high-resistance electronic interruption unit and a current in the low-voltage circuit that exceeds a first current threshold value.

This has the particular advantage that the circuit is activated, that is to say increased safety is provided, in the event of residual currents or a faulty electronic interruption unit.

In one advantageous embodiment of the invention, the ascertained current level is compared with a second current threshold value and an interruption of the low-voltage circuit, in particular by the mechanical isolating contact system, is initiated if said threshold value is exceeded.

This has the particular advantage that additional current-based overcurrent or short-circuit recognition is implemented, thus increasing the tripping reliability.

In one advantageous embodiment of the invention, if an interruption of the low-voltage circuit by means of the electronic interruption unit is initiated and there is a current flow in the low-voltage circuit that exceeds a third current threshold value and persists for a second time interval, which is in particular greater than the tripping time by means of the electronic interruption unit, an interruption of the low-voltage circuit by the mechanical isolating contact system is initiated.

This has the particular advantage that the low-voltage circuit is interrupted in the event of a defective electronic interruption unit, for example if the semiconductor-based switching elements have broken down, that is to say if an interruption by the electronic interruption unit has failed. This is preferably carried out after the conventional tripping time by means of the electronic interruption unit.

In one advantageous embodiment of the invention, the instantaneous threshold values are ascertained for each phase angle of the voltage of the low-voltage circuit, in particular by means of the digital second subunit which digitally ascertains the instantaneous threshold values at a clock frequency of between 10 kHz and 10 MHz, in particular 10 kHz and 1 MHz, more specifically between 10 kHz and 100 kHz, in particular starting from 18 kHz.

This has the particular advantage that there is a quick implementation, on the one hand, and an implementation that is not too complicated, on the other hand.

According to the invention, a corresponding method for a circuit breaker device for a low-voltage circuit having electronic (semiconductor-based) switching elements, having the same and further advantages, is claimed.

All embodiments, both in dependent form referring back to the independent patent claims and referring back only to individual features or combinations of features of patent claims, bring about an improvement in a circuit breaker device for fast and reliable deactivation in the event of short circuits.

The described properties, features and advantages of this invention and the way in which they are achieved will become clearer and more clearly comprehensible in connection with the following description of the exemplary embodiments, which are explained in more detail in connection with the drawing.

DETAILED DESCRIPTION OF THE INVENTION

Figure 1:
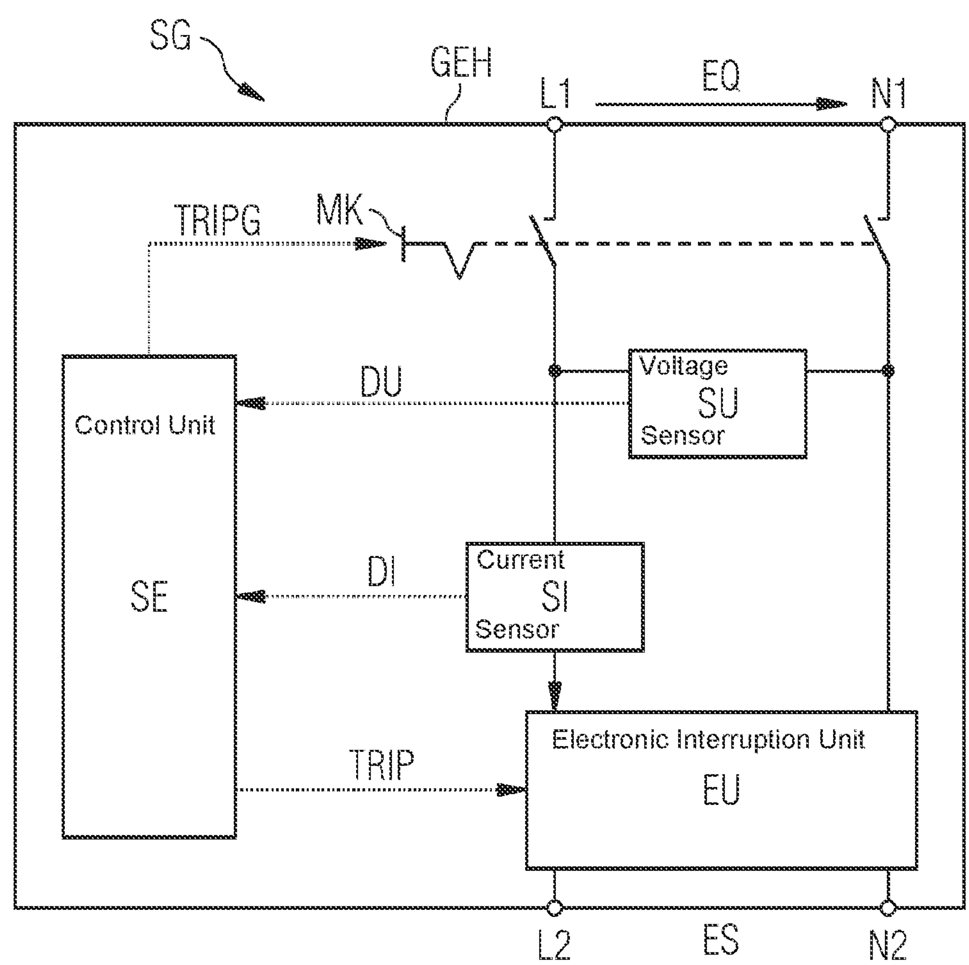
FIG. 1 shows an illustration of a circuit breaker device.

FIG. 1 shows an illustration of a circuit breaker device SG for protecting an electrical low-voltage circuit having a housing GEH, having:

- connections for conductors of the low-voltage circuit, in particular first connections L1, N1 for a grid-side, in particular energy source-side, connection EQ of the circuit breaker device SG and second connections L2, N2 for a load-side, in particular energy sink-side—in the case of passive loads, connection ES (consumer-side connection) of the circuit breaker device SG, wherein specifically phase conductor-side connections L1, L2 and neutral conductor-side connections N1, N2 may be provided;
- the load-side connection may have a passive load (consumer) or/and an active load ((further) energy source), or a load that may be both passive and active, for example in a time sequence;
- a voltage sensor SU for ascertaining the level of the voltage of the low-voltage circuit such that instantaneous voltage values (phase-related voltage values) DU available, are
- an electronic interruption unit EU that, due to semiconductor-based switching elements, has a high-resistance state of the switching elements for interrupting and a low-resistance state of the switching elements for allowing current to flow in the low-voltage circuit,
- a control unit SE that is connected to the voltage sensor and the interruption unit.

The circuit breaker device SG, in particular the control unit SE, is designed such that instantaneous (phase angle-related) threshold values are available. For example, in a simple case, the sinusoidal curve of the voltage, for example with a root-mean square value of 230 volts, the amplitude of which is 325 volts, could be stored, for each phase angle, with its expected instantaneous voltage value minus a reduction of for example 10% or a value between 10 and 30% or a fixed reduction of at least 10 volts, as instantaneous voltage value, wherein a value of at least 10 volts is used as the minimum instantaneous threshold value (in order to avoid false tripping). In the event of a reduction of for example 10%: 10 volts at 0° (minimum instantaneous threshold value), . . . , 146.25 volts (162.5 volts-10%) at 30°, . . . , 206.8 volts (229.8 volts-10%) at 45°, . . . , 253.3 volts (281.4 volts-10%) at 60°, 292.5 volts (325 volts-10%) at 90°, etc.

The instantaneous threshold values may be present in this case for each individual phase angle, a phase angle range (multiple phase angles), for example every 2°, or a phase angle section (part of a phase angle), for example every 0.5°.

The instantaneous voltage values DU are compared with the instantaneous threshold values in terms of phase angle. If the instantaneous threshold values are undershot or exceeded, an interruption of the low-voltage circuit is initiated in order to avoid a short-circuit current. In order to avoid a short-circuit current in a low-voltage AC circuit, a check is carried out in the positive half-cycle in order to determine whether the instantaneous threshold values have been undershot and a check is carried out in the negative half-cycle in order to determine whether the instantaneous threshold values have been exceeded.

Alternatively, the absolute values of the instantaneous voltage values DU may also be ascertained. The absolute values are then checked against undershooting (the absolute values of) the instantaneous threshold values, as a result of consideration of a mathematical sign is which advantageously dispensed with. The comparison is made in terms of phase angle, that is to say the instantaneous voltage value of for example a phase angle of 30° of the voltage is checked against the instantaneous threshold value of a phase angle of 30° of the voltage.

As an alternative, an (instantaneous) differential voltage value may be formed (continuously) from the instantaneous threshold value (possibly its absolute value) and the instantaneous voltage value DU (possibly its absolute value). The (instantaneous) differential voltage value is compared with an (absolute or instantaneous) differential voltage threshold value and an interruption of the low-voltage circuit is initiated when it is exceeded (or undershot—in the case of a comparison involving a mathematical sign) in order to avoid a short circuit.

As an alternative, a corridor check may likewise be performed, that is to say if the instantaneous voltage value differs by more than a particular percentage, in particular 10% (or a value in the range of 5 to 15%) or a particular +/−voltage absolute value, in particular a value in the range of 20 to 40 V, specifically 30 V, from the expected threshold value or expected voltage value, the interruption of the low-voltage circuit is initiated.

The interruption of the low-voltage circuit is initiated, for example, by means of a (first) signal TRIP which is transmitted from the control unit SE to the electronic interruption unit EU, as illustrated in FIG. 1.

The undershooting or exceeding may advantageously be present for a first time interval or for a phase angle range or phase angle section in order to initiate an interruption of the low-voltage circuit.

The electronic interruption unit EU is illustrated, according to FIG. 1, as a block in both conductors. In a first variant, this is understood to mean no interruption of both conductors.

At least one conductor, in particular the active conductor, or phase conductor, has semiconductor-based switching elements. The neutral conductor may be free from switching elements, that is to say without semiconductor-based switching elements. In other words, the neutral conductor is connected directly, that is to say does not become highly resistive. In other words, only a single-pole interruption (of the phase conductor) takes place. If further active conductors/phase conductors are provided, in a second variant of the electronic interruption unit EU, the phase conductors have semiconductor-based switching elements. The neutral conductor is connected directly, that is to say does not become highly resistive. By way of example, for a three-phase AC circuit.

In a third variant of the electronic interruption unit EU, the neutral conductor may likewise have a semiconductor-based switching element, in other words both conductors become highly resistive in the event of an interruption by the electronic interruption unit EU.

The electronic interruption unit EU may have semiconductor components such as bipolar transistors, field-effect transistors (FETs), insulated-gate bipolar transistors (IGBTs), metal-oxide-semiconductor field-effect transistors (MOSFETs) or other (self-commutated) power semiconductors. In particular, IGBTs and MOSFETs are particularly suitable for the circuit breaker device according to the invention due to low forward resistances, high junction resistances and a good switching behavior.

In addition, for one embodiment of the invention, provision may also be made for a current sensor SI for ascertaining the level of the current of the low-voltage circuit such that current values DI are available, as illustrated in the example according to FIG. 1. The current sensor SI is then connected to the control unit SE.

The circuit breaker device SG may preferably also have a mechanical isolating contact system, in particular according to standards with standard-compliant isolator properties, for galvanically isolating the circuit, in particular for activating (in contrast to deactivating) the circuit in a standard-compliant manner. The mechanical isolating contact system MK may be connected to the control unit SE, as illustrated in FIG. 1, such that the control unit SE is able to initiate galvanic isolation of the circuit.

Specifically, it is possible to implement a further evaluation that brings about galvanic isolation when other criteria are met. By way of example, provision may be made for overcurrent recognition, for example in the control unit SE, such that, in the event of overcurrents, that is to say in the event of current-time limit values being exceeded, that is to say when a current that exceeds a current limit value is present for a particular time, that is to say for example exceeds a particular energy threshold value, a semiconductor-based or/and galvanic interruption of the circuit takes place.

As an alternative or in addition, galvanic isolation may also be initiated for example in the event of a recognized short circuit.

The galvanic interruption of the low-voltage circuit is initiated for example by a further (second) signal TRIPG that is transmitted from the control unit SE to the mechanical isolating contact system MK, as illustrated in FIG. 1.

In a further advantageous embodiment, galvanic isolation can be initiated in the case of a (defective) high-resistance electronic interruption unit EU and a current in the low-voltage circuit that is determined, in particular, by the current sensor SI and exceeds a first current threshold value. Depending on the field of use of the circuit breaker device, the first current threshold value may be of the order of magnitude of 4 to 6 mA, in particular 5 mA or 6 mA. The first current threshold value may be in the range of 26 mA to 30 mA, in particular 28 mA, 29 mA or 30 mA, in particular for personal protection in Europe. The third threshold value may be in the range of 290 mA to 300 mA, in particular for fire protection. Each of the boundary and intermediate values is disclosed.

In a further advantageous embodiment, an interruption of the low-voltage circuit may be initiated, in particular by the mechanical isolating contact system, if a current level that exceeds a second current threshold value is ascertained.

The second current threshold value corresponds, for example, to the standard-compliant current (time) limit values, that is to say the I(t) characteristic curves for circuit breakers, for example according to the IEC 60947 or IEC 60898 standard. The chosen current (time) limit values are chosen by a person skilled in the art according to the present use/application.

In a further advantageous embodiment, if an interruption of the low-voltage circuit by means of the electronic interruption unit is initiated and there is a current flow in the low-voltage circuit that exceeds a third current threshold value and persists for a second time interval, an interruption of the low-voltage circuit by the mechanical isolating contact system can be initiated in order to bring about an interruption by the mechanical isolating contact system in the event of failed high resistance of the electronic interruption unit and therefore failed interruption of the low-voltage circuit. The operational reliability is therefore advantageously increased. Such a process can advantageously be displayed on the circuit breaker device.

The third current threshold value and the second time interval correspond, for example, to the standard-compliant current-time limit values, that is to say the I-t characteristic curves for protection devices, for example according to the IEC 60947 or IEC 60898 standard. The chosen current-time limit values are chosen by a person skilled in the art according to the present use/application.

The mechanical isolating contact system MK may perform single-pole interruption in a first variant. In other words, only one conductor of the two conductors, in particular the active conductor or phase conductor, is interrupted, that is to say has a mechanical contact. The neutral conductor is then free from contacts, that is to say the neutral conductor is connected directly.

If further active conductors/phase conductors are provided, in a second variant, the phase conductors have mechanical contacts of the mechanical isolating contact system. The neutral conductor is connected directly in this second variant. By way of example, for a three-phase AC circuit.

In a third variant of the mechanical isolating contact system MK, the neutral conductor likewise has mechanical contacts, as illustrated in FIG. 1.

Mechanical isolating contact system MK denotes in particular a (standard-compliant) isolating function, performed by the isolating contact system MK. Isolating function denotes the points:

- minimum clearance in air in accordance with standards (minimum distance between the contacts),
- displaying the contact position of the contacts of the mechanical isolating contact system,
- actuation of the mechanical isolating contact system possible at all times (no blocking of the isolating contact system).

With regard to the minimum clearance in air between the contacts of the isolating contact system, this is essentially voltage-dependent. Further parameters are the pollution degree, the type of field (homogeneous, inhomogeneous) and the air pressure or height above sea level.

There are corresponding specifications or standards for these minimum clearances in air or creepage distances. These specifications specify, for example in the case of air, for an impulse withstand voltage, the minimum clearance in air for an inhomogeneous and a homogeneous (ideal) electric field as a function of the pollution degree. Impulse withstand voltage is the ability to withstand the application of a corresponding impulse voltage. The isolating contact system or circuit breaker device has an isolating function (isolator property) only when this minimum length (minimum distance) is present.

In the context of the invention, the DIN EN 60947 or IEC 60947 series of standards is relevant here for the isolator function and its properties, which is incorporated here by reference.

The isolating contact system is advantageously characterized by a minimum clearance in air between the open isolating contacts in the OFF position (open position, open contacts) as a function of the rated impulse withstand voltage and the pollution degree. The minimum clearance in air is in particular between (at least) 0.01 mm and 14 mm. The minimum clearance in air is in particular advantageously between 0.01 mm at 0.33 kV and 14 mm at 12 kV, in particular for pollution degree 1 and in particular for inhomogeneous fields.

The minimum clearance in air may advantageously have the following values:

E DIN EN 60947-1 (VDE 0660-100):2018-06

TABLE 13

Minimum clearances in air

| Rated impulse withstand voltage $U_{imp}$ | Minimum clearance mm | | | | | | | |
|---|---|---|---|---|---|---|---|---|
| | Case A Inhomogeneous field conditions (see 3.7.63) Pollution degree | | | | Case B Homogeneous field ideal conditions (see 3.7.62) Pollution degree | | | |
| kV | 1 | 2 | 3 | 4 | 1 | 2 | 3 | 4 |
| 0.33 | 0.01 | 0.2 | 0.8 | 1.6 | 0.01 | 0.2 | 0.8 | 1.6 |
| 0.5 | 0.04 | | | | 0.04 | | | |
| 0.8 | 0.1 | | | | 0.1 | | | |
| 1.5 | 0.5 | 0.5 | | | 0.3 | 0.3 | | |
| 2.5 | 1.5 | 1.5 | 1.5 | | 0.6 | 0.6 | | |
| 4.0 | 3 | 3 | 3 | 3 | 1.2 | 1.2 | 1.2 | |
| 6.0 | 5.5 | 5.5 | 5.5 | 5.5 | 2 | 2 | 2 | 2 |
| 8.0 | 8 | 8 | 8 | 8 | 3 | 3 | 3 | 3 |
| 12 | 14 | 14 | 14 | 14 | 4.5 | 4.5 | 4.5 | 4.5 |

NOTE
The values of minimum clearances in air are based on 1.2/50 μs impulse voltage, for barometric pressure of 80 kPa, equivalent to normal atmospheric pressure at 2 000 m above sea level.

The pollution degrees and types of field correspond to those defined in the standards. This advantageously makes it possible to achieve a standard-compliant circuit breaker device dimensioned in accordance with the rated impulse withstand voltage.

Figure 2:
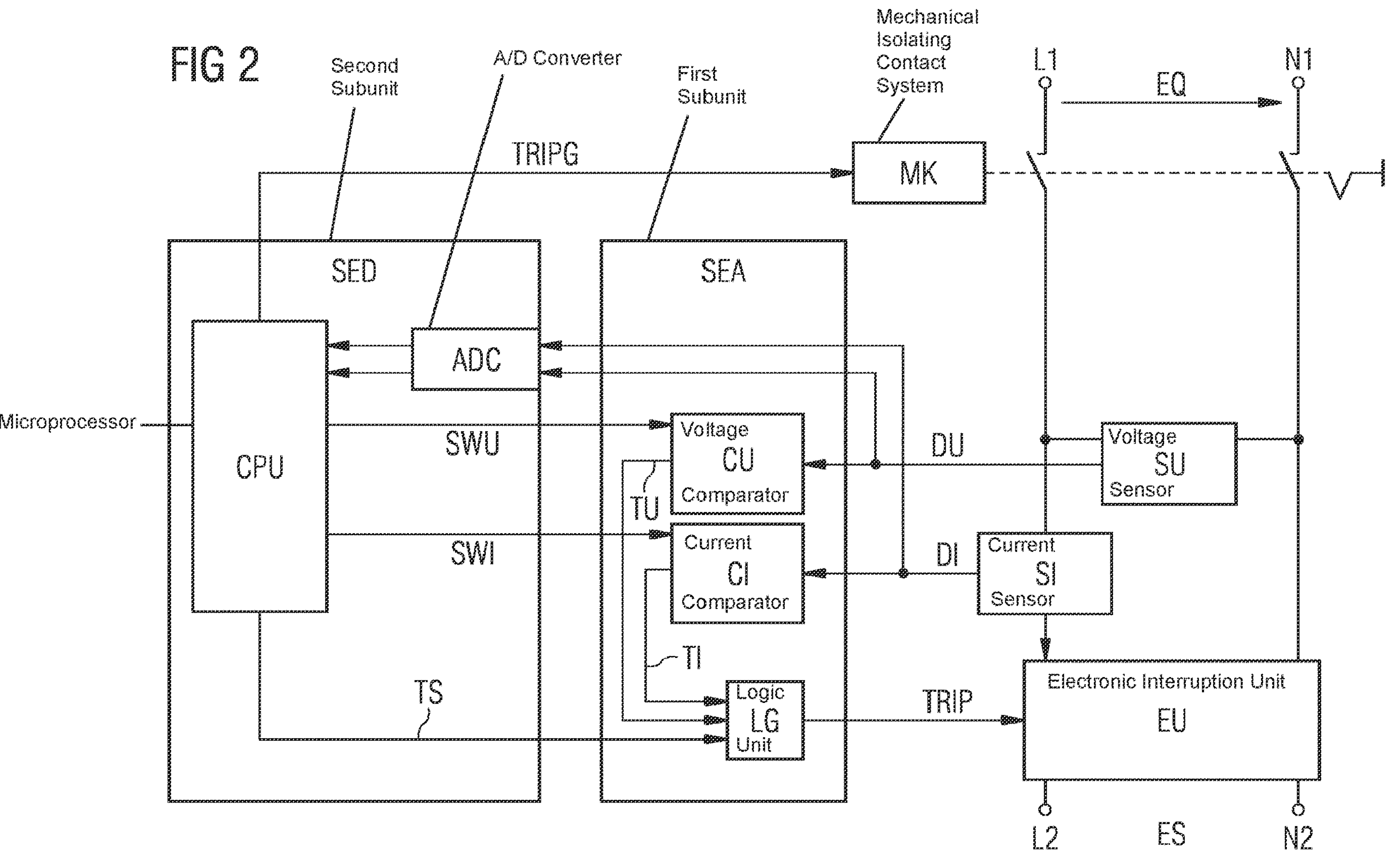
FIG. 2 shows a first embodiment of the circuit breaker device.

FIG. 2 shows an illustration according to FIG. 1, with a further detailed embodiment. In this case, the control unit SE has two subunits, a preferably analog first subunit SEA and a preferably digital second subunit SED. The first subunit SEA in this case has a voltage comparator CU. This is supplied, on the one hand, with the instantaneous voltage values DU from the voltage sensor SU. On the other hand, the voltage comparator CU is supplied with the instantaneous threshold values SWU from the second subunit SED.

The voltage comparator CU compares the instantaneous voltage values DU with the instantaneous threshold values SWU and outputs, as described in the event of exceeding or undershooting, a voltage interruption signal TU for initiating an interruption of the low-voltage circuit.

The voltage interruption signal TU may be supplied to a logic unit LG which combines it with other interruption signals and outputs the (first) signal TRIP to the electronic interruption unit EU for the semiconductor-based interruption or high-resistance interruption.

In one embodiment, the voltage comparator CU buffer-stores the instantaneous threshold values SWU in order to constantly have the values available.

The instantaneous voltage values DU are additionally supplied to the second subunit SED. In one preferred embodiment, the instantaneous voltage values DU are digitized there by an analog-to-digital converter ADC and supplied to a microprocessor CPU. This ascertained or calculated the instantaneous threshold values SWU. The instantaneous threshold values SWU ascertained by the second subunit SED or in particular the microprocessor CPU are in turn supplied to the first subunit SEA, in particular the voltage comparator CU, in order to perform the comparison described above.

In this case, the instantaneous threshold values SWU may advantageously be ascertained digitally in the second subunit SED or at a slower processing speed than the continuous comparison of voltage values and threshold values in the first subunit SEA.

In one advantageous embodiment, in which provision is made for a current sensor SI that outputs the level of the current, that is to say instantaneous current values DI, the first subunit SEA may have a current comparator CI. This is supplied on the one hand with the instantaneous current values DI from the current sensor SI. On the other hand, the current comparator CI is supplied with instantaneous current threshold values SWI from the second subunit SED. The current comparator CI compares the instantaneous current values DI with the instantaneous current threshold values SWI and outputs, in the same way as when the current is exceeded in terms of absolute value, a current interruption signal TI in order to initiate an interruption of the low-voltage circuit.

The current interruption signal TI may be supplied to the logic unit LG which combines it with other interruption signals and outputs the (first) signal TRIP to the electronic interruption unit EU for the semiconductor-based interruption or high-resistance interruption.

In one embodiment, the current comparator CI buffer-stores the instantaneous current threshold values SWI in order to have the values constantly available.

The instantaneous current values DI are additionally supplied to the second subunit SED. In one preferred embodiment, the instantaneous current values DI are digitized there by the analog-to-digital converter ADC and supplied to the microprocessor CPU. This ascertained or calculated the instantaneous current threshold values SWI. The instantaneous current threshold values SWI ascertained by the second subunit SED or in particular the microprocessor CPU are in turn supplied to the first subunit SEA, in particular the current comparator CI, in order to perform the comparison described above.

In this case, the instantaneous current threshold values SWI may advantageously be ascertained digitally in the second subunit SED or at a slower processing speed than the continuous comparison of current values and threshold values in the first subunit SEA.

Depending on the embodiment, a second interruption signal TRIPG may be output by the second subunit SED, in particular by the microprocessor CPU, to the mechanical isolating contact system MK for the galvanic interruption of the low-voltage circuit, as illustrated in FIG. 2.

Figure 3:
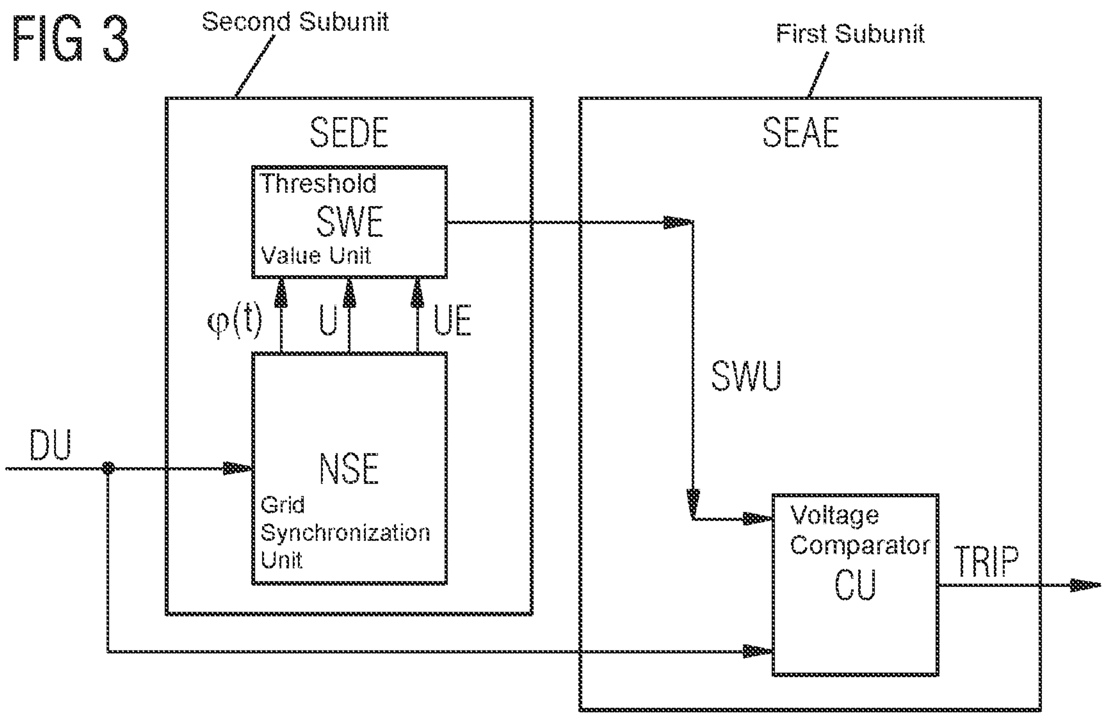
FIG. 3 shows a second embodiment of the circuit breaker device.

FIG. 3 shows a further embodiment or variant according to FIG. 1 and FIG. 2. FIG. 3 shows part of a simple variant of the first, preferably analog, subunit SEAE and part of an alternative variant of the preferably digital second subunit SEDE.

The part of the simple variant of the first subunit SEAE has the voltage comparator CU which is supplied with the instantaneous voltage values DU, in particular their absolute value, and the instantaneous threshold values SWU, in particular likewise based on absolute value. The voltage comparator CU in this example outputs the first signal TRIP for interrupting the low-voltage circuit directly, in the same way as FIG. 2. The absolute value may be formed by one or more units, not illustrated.

The part of the alternative variant of the second subunit SEDE has a grid synchronization unit NSE. This is supplied with the (analog) instantaneous voltage values DU. The grid synchronization unit NSE, from the supplied (analog) instantaneous voltage values DU, which are a sinusoidal AC voltage of the low-voltage circuit, ascertains the amplitude U, the phase angle φ(t) and an expected temporal value of the voltage UE or expected value of the voltage UE. The expected value of the voltage UE is a kind of filtered or regenerated or generated equivalent instantaneous voltage value DU.

The expected value of the voltage UE, as well as the amplitude U and the phase angle φ(t), may be ascertained for example by what is known as a phase locked loop, PLL for short. A PLL is an electronic circuit arrangement that influences the phase angle and thus accordingly the frequency of changeable oscillator via a closed control loop such that the phase difference between an external periodic reference signal (instantaneous voltage values) and the oscillator or a signal derived therefrom is as constant as possible.

This makes it possible to ascertain inter alia the fundamental frequency and its amplitude of the supplied grid voltage, that is to say the ascertained voltage values, that is to say the (interference-free or filtered) expected value of the (grid) voltage.

The amplitude U, phase angle φ(t) and expected temporal value of the voltage UE as ascertained by the grid synchronization unit NSE are supplied to a threshold value unit SWE. The threshold value unit SWE modifies the expected value of the voltage UE to form an instantaneous threshold value SWU, wherein for example:

- a fixed voltage absolute value may be subtracted from the expected value of the voltage UE, or
- a voltage absolute value dependent on the phase angle may be subtracted from the expected value of the voltage UE, or
- a fixed percentage of the voltage may be subtracted from the expected value of the voltage UE, or
- a phase angle-dependent percentage of the voltage may be subtracted from the expected value of the voltage UE, in order to obtain the instantaneous threshold value SWU.

The instantaneous threshold value SWU may furthermore be adjusted by the amplitude U of the instantaneous voltage, that is to say that, at a high amplitude of the voltage, a high instantaneous threshold value is present and, at a low amplitude of the voltage, a low instantaneous threshold value is present.

The instantaneous threshold values SWU may be conveyed, by the presence of the phase angle φ(t) in the threshold value unit SWE, from this, synchronously with the instantaneous voltage DU, to the voltage comparator CU, such that a phase-related (phase angle-related) comparison is able to be performed between the instantaneous threshold value and the instantaneous voltage value in the voltage comparator CU.

Figure 4:
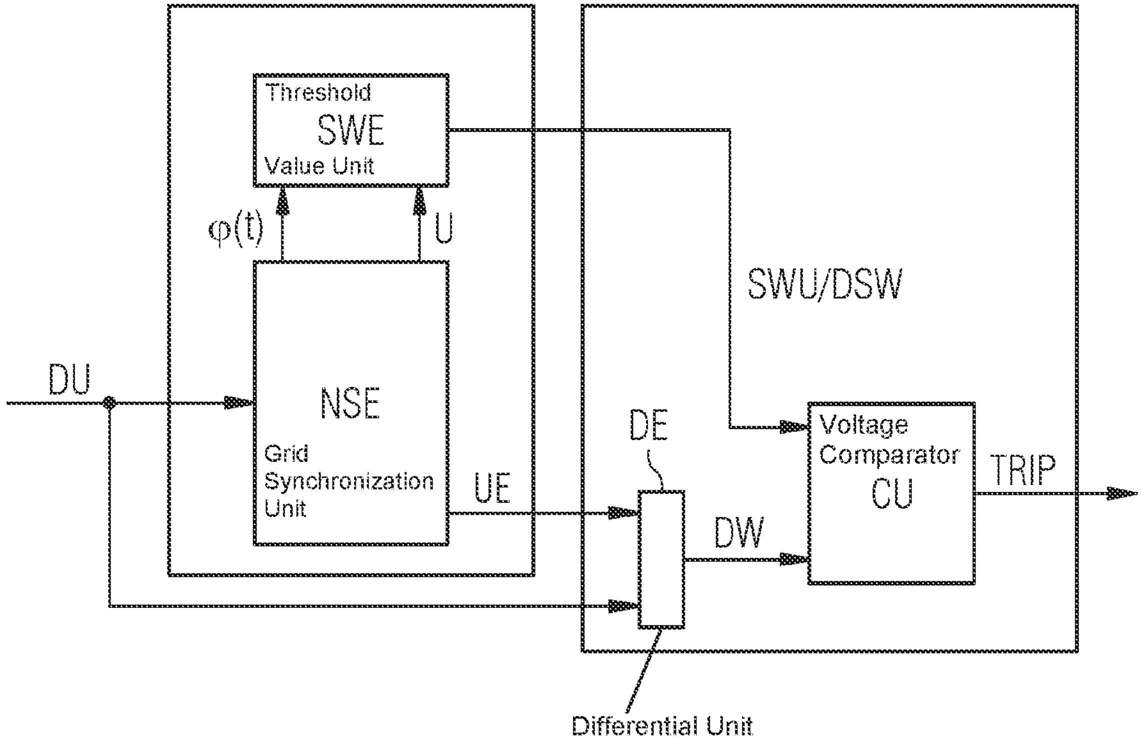
FIG. 4 shows a third embodiment of the circuit breaker device.

FIG. 4 shows an alternative embodiment according to FIG. 3, with the difference that the expected value of the voltage UE is supplied not to the threshold value unit SWE, but rather to a differential unit DE. The instantaneous voltage value DU is furthermore supplied not to the voltage comparator CU, but rather to the differential unit DE. The differential unit DE forms a difference between the expected value of the voltage UE and the instantaneous voltage value DU, this taking place in a phase angle-related or phase angle-accurate manner. This thus generates a (phase angle-dependent) differential voltage value DW which is supplied to the voltage comparator CU. The voltage comparator CU is also supplied with the instantaneous threshold value SWU which is provided by the threshold value unit SWE in this example in a phase-related and amplitude-influenced manner as a (phase-related) differential voltage threshold value.

The expected value of the voltage UE as output by the grid synchronization unit, in particular in the form of a PLL, is compared in this example with the instantaneous voltage value DU, in particular in a time-synchronous or phase-synchronous manner, such that there is a difference between the values DW. A PLL may often perform such a function itself, that is to say output the difference, that is to say a differential voltage value DW.

The differential voltage value DW is then compared, in particular in terms of absolute value, with the instantaneous threshold value SWU, in this case a differential voltage threshold value.

Alternative embodiments are also conceivable.

Figure 5:
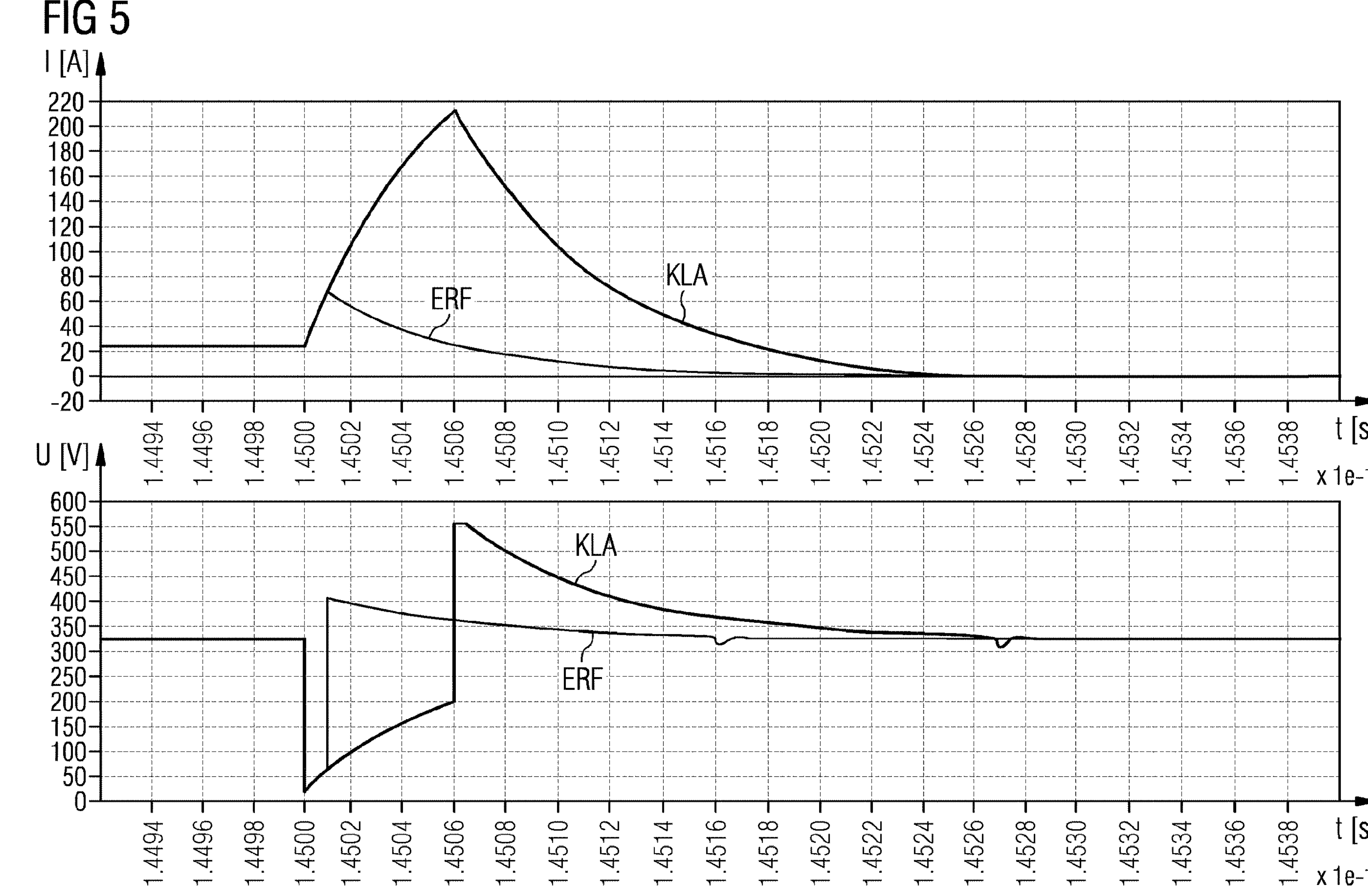
FIG. 5 shows current and voltage characteristics over time.

FIG. 5 shows characteristics of the current I in amperes A (at the top) and the voltage U in volts (at the bottom)—on the vertical y axis—against the time t in seconds s—on the horizontal x axis. The simulated comparison of the temporal characteristic ERF of the presented invention with respect to the temporal characteristic KLA of a simple (conventional) overcurrent deactivation is illustrated. A short circuit occurs at t=145 ms. The current I increases with a high gradient and the measured voltage U suddenly dips at the same time.

The temporal characteristic KLA of the simple overcurrent deactivation which interrupts the current flow if 200 A are exceeded. On account of latencies and deactivation times, however, the current continues to increase for a short time after the limit value has been exceeded.

The temporal characteristic ERF of the short-circuit recognition according to the invention is based on the recognition of the strong dip in the measured voltage, which is recognized very quickly by means of a phase-accurate comparison with the expected voltage. The phase angle resolution determines the speed with which the threshold values are calculated. In the case of a phase angle resolution of 1°, in other words for each full phase angle of the voltage, a threshold value is present, that is to say an instantaneous threshold value is present roughly every 55.5 μs. The deactivation is preferably achieved using an analog comparator, that is to say continuously, and is thus much faster than the phase angle resolution.

As an alternative, the following temporal characteristic applies in the case of fully digital processing. The phase angle resolution determines the speed of recognition. In the case of a phase angle resolution of 1°, in other words for each full phase angle of the voltage, a threshold value is present, that is to say an instantaneous threshold value is present roughly every 55.5 µs, meaning that deactivation may take place after a minimum of around 60 µs. Shorter deactivation times may be achieved at higher phase angle resolutions.

In this example, the values are then processed at at least 18 KHz.

As an alternative, the expected value of the voltage may be stored in a table, wherein the respective voltage values are then compared in a phase-synchronous manner or a phase-synchronous difference is formed, such that differential voltage values are present.

Figure 6:
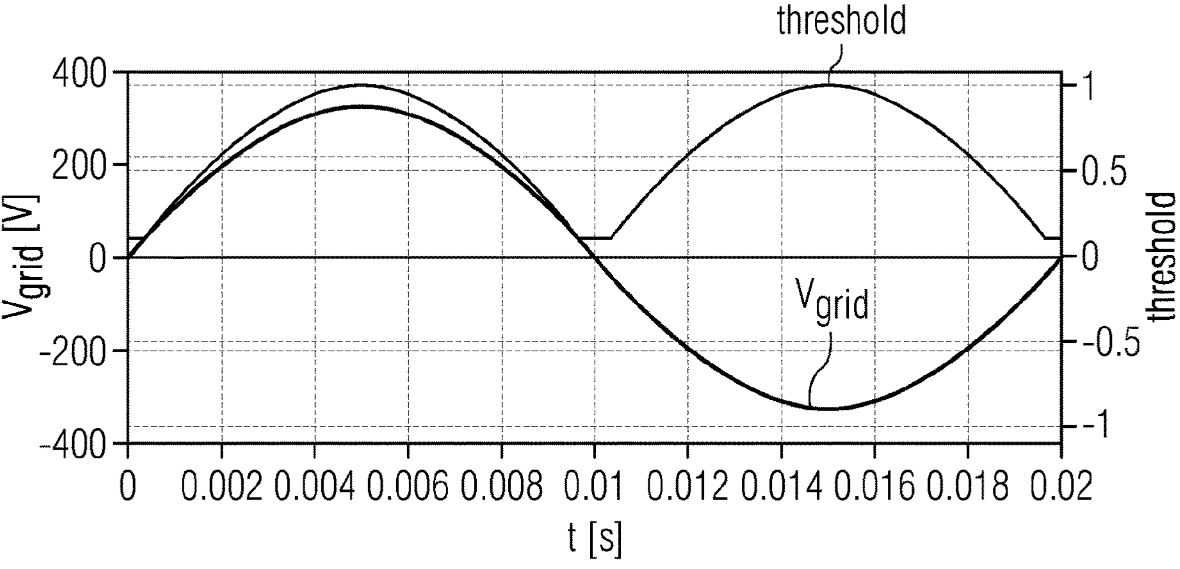
FIG. 6 shows voltage and threshold value characteristics over time.

FIG. 6 shows, on the one hand, the characteristic of the voltage Vgrid in volts [V], on the left-hand vertical axis, of one period of a sinusoidal AC voltage against the time t in s [s], on the horizontal axis.

On the other hand, FIG. 6 shows a phase angle-related or phase angle-dependent instantaneous threshold value threshold, on the right-hand vertical axis, against the time t in s [s].

In this case, in the example, the instantaneous threshold value is greater than the instantaneous voltage.

Although the invention has been described and illustrated more specifically in detail by the exemplary embodiment, the invention is not restricted by the disclosed examples and other variations may be derived therefrom by a person skilled in the art without departing from the scope of protection of the invention.

The invention claimed is:

1. A circuit breaker device for protecting an electrical low-voltage circuit, the circuit breaker device comprising:
- a housing of the circuit breaker having connections to be connected to conductors of the low-voltage circuit;
- a voltage sensor for ascertaining a voltage level of the low-voltage circuit and making instantaneous voltage values available, the instantaneous voltage values being phase angle-related threshold values made available for each phase angle or a phase angle range having multiple phase angles or a phase angle section being part of a phase angle;
- an electronic interruption unit including semiconductor-based switching elements having a high-resistance state of said switching elements for interrupting, and a low-resistance state of said switching elements for allowing, current to flow in the low-voltage circuit; and
- a control unit connected to said voltage sensor and to said electronic interruption unit;
- the circuit breaker device configured to:
  - make instantaneous threshold values available,
  - compare the instantaneous voltage values with the instantaneous threshold values in terms of phase angle by comparing a threshold value for a phase angle with a voltage value for the same phase angle of the voltage,
  - upon the instantaneous threshold values being exceeded or undershot, or a differential voltage value being formed from the instantaneous threshold value and the instantaneous voltage value, compare the differential voltage value with a differential voltage threshold value, and
  - upon the threshold value being exceeded or undershot, initiate an interruption of the low-voltage circuit by said electronic interruption unit including said semiconductor-based switching elements to avoid a short-circuit current.

2. The circuit breaker device according to claim 1, wherein the instantaneous threshold values are adapted based on an amplitude of the voltage of the low-voltage circuit, providing a high instantaneous threshold value in case of a high amplitude of the voltage and a low instantaneous threshold value in case of a low amplitude of the voltage.

3. The circuit breaker device according to claim 1, wherein:
- absolute values of the instantaneous voltage values are compared with the instantaneous threshold values in terms of phase angle;
- upon the absolute value of the instantaneous threshold value being undershot, or the differential voltage value being formed from the instantaneous threshold value and the absolute value of the instantaneous voltage value, the differential voltage value being compared with the differential voltage threshold value; and
- upon the threshold value being exceeded, an interruption of the low-voltage circuit being initiated.

4. The circuit breaker device according to claim 1, wherein the exceeding or undershooting must be present for a first time interval to initiate an interruption of the low-voltage circuit.

5. The circuit breaker device according to claim 1, which further comprises:
- a grid synchronization unit, said grid synchronization unit outputting, from the supplied instantaneous voltage values:
  - an expected temporal value of the voltage,
  - a phase angle of the voltage, and
  - an amplitude of the voltage;
- a threshold value unit receiving the expected temporal value, the phase angle and the amplitude of the voltage and ascertaining the instantaneous threshold values from the expected temporal value, the phase angle and the amplitude of the voltage; and
- the instantaneous voltage values being compared with the instantaneous threshold values to ascertain an initiation of an interruption.

6. The circuit breaker device according to claim 1, which further comprises:
- a grid synchronization unit, said grid synchronization unit outputting, from the supplied instantaneous voltage values:
  - an expected temporal value of the voltage,
  - a phase angle of the voltage, and
  - an amplitude of the voltage;
- a threshold value unit receiving the phase angle and the amplitude of the voltage supplied and ascertaining differential voltage threshold values or instantaneous differential voltage threshold values, from the phase angle and the amplitude of the voltage;
- a differential unit receiving the instantaneous voltage values and the expected temporal value of the voltage and ascertaining a differential voltage value or a phase angle-dependent differential voltage value; and
- the instantaneous differential voltage value being compared with the differential voltage threshold value or the instantaneous differential voltage threshold value, to ascertain an initiation of an interruption.

7. The circuit breaker device according to claim 1, wherein the instantaneous threshold values are ascertained for each phase angle of the voltage of the low-voltage circuit.

8. The circuit breaker device according to claim 1, wherein:

said control unit includes an analog first subunit and a digital second subunit;

said first subunit has a voltage comparator receiving the instantaneous voltage values from said voltage sensor and the instantaneous threshold values from said second subunit, for comparing the instantaneous voltage values with the instantaneous threshold values and initiating an interruption of the low-voltage circuit upon the threshold values being exceeded or undershot; and said second subunit also receives the instantaneous voltage values for ascertaining the instantaneous threshold values.

9. The circuit breaker device according to claim 8, wherein the instantaneous threshold values are ascertained for each phase angle of the voltage of the low-voltage circuit by said digital second subunit digitally ascertaining the instantaneous threshold values at a clock frequency of between 10 kHz and 10 MHz.

10. The circuit breaker device according to claim 9, wherein the clock frequency is between 10 KHz and 1 MHz.

11. The circuit breaker device according to claim 9, wherein the clock frequency is between 10 KHz and 100 KHz.

12. The circuit breaker device according to claim 9, wherein the clock frequency is above 18 KHz.

13. The circuit breaker device according to claim 1, which further comprises:

a mechanical isolating contact system connected in series with said electronic interruption unit on a circuit side for providing galvanic isolation in the low-voltage circuit;

said mechanical isolating contact system being connected to said control unit.

14. The circuit breaker device according to claim 13, wherein an electrical interruption by said mechanical isolating contact system is initiated, in addition to an interruption by said electronic interruption unit.

15. The circuit breaker device according to claim 13, which further comprises a current sensor for ascertaining a current level of the low-voltage circuit.

16. The circuit breaker device according to claim 15, wherein galvanic isolation is initiated by said mechanical isolating contact system in case of a high-resistance of said electronic interruption unit and a current in the low-voltage circuit exceeding a first current threshold value.

17. The circuit breaker device according to claim 16, wherein the ascertained current level is compared with a second current threshold value and an interruption of the low-voltage circuit by said mechanical isolating contact system is initiated upon exceeding the threshold value.

18. The circuit breaker device according to claim 15, wherein said mechanical isolating contact system initiates an interruption of the low-voltage circuit upon initiating an interruption of the low-voltage circuit by said electronic interruption unit and a current flow in the low-voltage circuit exceeding a third current threshold value and persisting for a second time interval.

19. A method for protecting an electrical low-voltage circuit, the method comprising:

ascertaining a voltage level of the low-voltage circuit and making instantaneous voltage values available, the instantaneous voltage values being phase angle-related threshold values made available for each phase angle or a phase angle range having multiple phase angles or a phase angle section being part of a phase angle;

making instantaneous threshold values available;

comparing the instantaneous voltage values with the instantaneous threshold values in terms of phase angle by comparing a threshold value for a phase angle with a voltage value for the same phase angle of the voltage;

upon exceeding or undershooting the instantaneous threshold values, or forming a differential voltage value from the instantaneous threshold value and the instantaneous voltage value, comparing the differential voltage value with a differential voltage threshold value; and upon exceeding or undershooting the threshold value, initiating an interruption of the low-voltage circuit by using an electronic interruption unit including semiconductor-based switching elements to avoid a short-circuit current.

* * * * *